United States Patent [19]

Noda et al.

[11] Patent Number: 5,153,863
[45] Date of Patent: Oct. 6, 1992

[54] APPARATUS FOR OPTICALLY RECORDING AND REPRODUCING INFORMATION

[75] Inventors: Kazuo Noda, Yokohama; Koichi Yamazaki, Sakado, both of Japan

[73] Assignee: Nippon Conlux Co., Ltd., Tokyo, Japan

[21] Appl. No.: 744,645

[22] Filed: Aug. 8, 1991

Related U.S. Application Data

[63] Continuation of Ser. No. 332,012, Mar. 31, 1989, abandoned.

[30] Foreign Application Priority Data

Apr. 4, 1988 [JP] Japan .................................. 63-82626

[51] Int. Cl.$^5$ .............................................. G11B 7/00
[52] U.S. Cl. ................................ 369/44.11; 369/44.37; 369/44.41; 369/44.26; 369/109
[58] Field of Search ............... 369/44.37, 44.38, 44.39, 369/109, 111, 44.18, 44.26, 44.41, 44.42, 44.11

[56] References Cited

U.S. PATENT DOCUMENTS

| | | | |
|---|---|---|---|
| 4,598,393 | 7/1986 | Pierce et al. | 369/44.26 |
| 4,658,389 | 4/1987 | Kuehn | 360/44.41 |
| 4,660,191 | 4/1987 | Maeda et al. | 369/44.41 |
| 4,686,663 | 8/1987 | Kühn | 369/44.15 |
| 4,695,992 | 9/1987 | Aoi | 369/44.42 |
| 4,831,609 | 5/1989 | Suzuki | 369/44.26 |
| 4,881,214 | 11/1989 | Izawa et al. | 369/44.38 |

*Primary Examiner*—Roy N. Envall, Jr.
*Assistant Examiner*—Nabil Hindi
*Attorney, Agent, or Firm*—Koda and Androlia

[57] ABSTRACT

An apparatus for optically recording and reproducing information in and from an optical information recording medium having a guide track. The apparatus uses an optical head having a diffraction grating, for recording and reproducing information. In recording information, a zero-order diffraction light beam from the diffraction grating is used for the information recording, and plus/minus first-order diffraction light beams from the diffraction grating are used for the tracking. In reproducing information, the zero-order diffraction light beam is used for the tracking, and higher- and odd-order diffraction light beams including at least plus/minus first-order diffraction light beams are used for information reproduction.

4 Claims, 4 Drawing Sheets

APPARATUS FOR OPTICALLY RECORDING AND REPRODUCING INFORMATION

This is a continuation of application Ser. No. 332,012, filed Mar. 31, 1989, now abandoned.

BACKGROUND OF THE INVENTION

1. Field of the Invention

The present invention relates to an apparatus for optically recording and reproducing information, and more particularly to an apparatus as above for use with a card type optical information recording medium.

2. Description of Related Background Art

As an optical information recording medium of this type there is known a so-called write-once type optical card capable of recording information once and reproducing the recorded information plural times. In recording information in a write-once type optical card (hereinafter simply called an optical card), a light beam modulated by the information to be recorded is converged into a fine light spot by using a lens. The fine light spot (hereinafter simply called a light spot) is applied onto an information recording area of the optical card while scanning it along the information recording area. The information is accordingly recorded in the optical card as a pit train (information track) optically detectable, e.g., based on a difference of light reflectance between the pit area and the other area. In reproducing the recorded information, a light spot having less optical energy than that used for the recording is applied onto the information track while scanning it along the track. The reflected light from the information track is detected to reproduce the recorded information.

An optical head is generally used for recording/reproducing information while applying a light spot onto an optical card. Either an optical head or an optical card is reciprocally moved in order to conduct light beam scanning. However, an optical head is a precision instrument constructed of a number of optical components and drive elements so that it has a poor resistance against impact motions such as rapid acceleration and deceleration. An optical card should be maintained so as to have no warp and held in position on a shuttle with as small a setting error as possible. Therefore, the shuttle is sufficiently strongly constructed to press an optical card and adjust warp or the like to some degree, resulting in a limit to making it light-weight. In view of the above, it is difficult to reciprocally move an optical head or an optical card (shuttle), whichever may be, at high speed. Thus, it has been difficult to realize high speed information recording/reproduction.

Reproducing information in particular is carried out frequently and repeatedly so that there is much demand for high speed reproduction which the conventional background art cannot provide.

SUMMARY OF THE INVENTION

It is therefore an object of the present invention to solve the above problems and provide an apparatus for optically recording and reproducing information, which apparatus records information on an optical card by using a well known three-beam method (or three-spot method), and reproduces the recorded information such that the recorded information is reproduced optically at a first speed corresponding to a reciprocal motion of an optical head or an optical card and stored in a memory, and read from the memory at a second speed two or four times as fast as the first speed. The first speed may be the same as that conventionally used. In this specification, the term "reproducing information" is intended to mean picking up information from the information track by using a light spot, and the term "reading information" is intended to mean picking up the reproduced information from the memory into which the reproduced image has been stored.

The above object can be achieved by the apparatus for optically recording and reproducing information of this invention. The apparatus uses an optical head having a diffraction grating and an optical information recording medium having guide tracks. Information recording is carried out using a zero-order diffraction light beam from the diffraction grating, whereas tracking is carried out using plus/minus first-order diffraction light beams from the diffraction grating. In reproducing information, tracking is carried out using a zero-order light beam from the diffraction grating, whereas information reproducing is carried out using higher-order diffraction light beams including at least plus/minus first-order diffraction light beams. Focussing is carried out using a zero-order light beam both for the information recording and reproduction. A semiconductor laser of the optical head is activated at high optical output power for the information recording, and at low optical output power for the information reproduction. A plurality of information signals obtained from the reproduced information by using the higher order diffraction light beams containing at least plus/minus first order diffraction light beams are temporarily stored in a plurality of memories. Thereafter, the information signals stored in the memories are sequentially read at a speed faster than that of storing the information signals.

Since a high energy light beam is used in recording information in an optical information recording medium, the zero-order diffraction light beam obtained from a diffraction grating is applied onto the recording medium. The zero-order diffraction light beam has the highest energy among diffraction light beams from a diffraction grating. Tracking is carried out using plus/minus first-order diffraction light beams having lower energy than the zero-order diffraction light beam, whereas focussing is carried out using the zero-order diffraction light beams reflected from the surface of the recording medium.

In reproducing the information recorded in the optical information recording medium as above, information is read from a plurality of recording tracks of the recording medium at the same time. To this end, a plurality of higher- and odd-order diffraction light beams including at least the plus/minus first-order diffraction light beams are applied onto the surface of the recording medium. The more the higher-order diffraction light beams are used, the more information can be reproduced from a plurality of information tracks, thus allowing a higher reading speed.

According to the apparatus for optically recording and reproducing information of this invention, the three-beam method using zero-order and plus/minus first-order diffraction light beams from a diffraction grating is employed in recording information while carrying out tracking. In reproducing information, tracking is carried out using the zero-order diffraction light beam from the diffraction grating in a push-pull manner, whereas the information is reproduced using plus/minus first- or higher- order diffraction light beams. Therefore, after recording information by using a highly stable tracking method, the information can be read at high speed, without changing the scan speed of a light spot applied to and scanned on an optical information recording medium, by providing a simple switching circuitry. Therefore, the performance of information read can be improved and a compact and cost effective apparatus can be realized.

BRIEF DESCRIPTION OF THE DRAWINGS

The above and other objects, advantages of this invention will become apparent to those skilled in the art from the following detailed description of the preferred embodiments when read in connection with the accompanying drawings, in which.

DETAILED DESCRIPTION OF THE PREFERRED EMBODIMENTS

Figure 1:
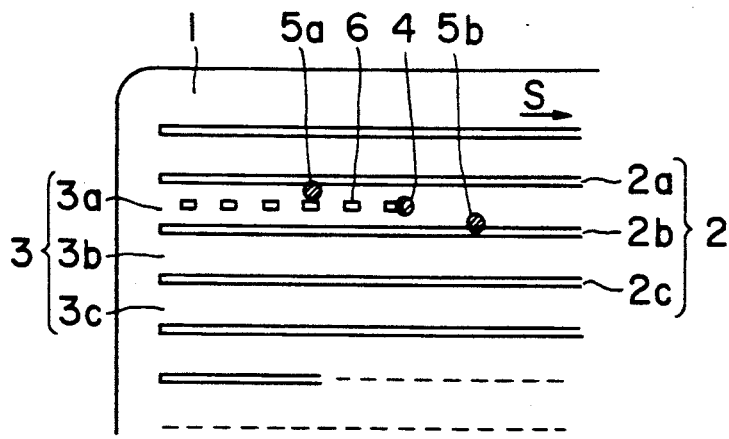
FIG. 1 is a schematic plan view showing an optical card and light spots on the card while information is recorded therein by using the apparatus of this invention.

FIG. 1 shows a positional relationship between an optical card and light spots while information is recorded in the card by using the apparatus of this invention. Referring to FIG. 1, an optical card 1 is formed with guide tracks 2 (2a, 2b, 2c, . . . ) having, e.g., a smaller light reflectance, and information recording areas 3 (3a, 3b, 3c, . . . ) interposed between guide tracks 2. By using the well known three-beam method, an optical head applies three light spots onto the optical card 1. Namely, a light spot 4 is applied onto the information area 3a, a light spot 5a onto both the information area 3a and guide track 2a, and a light spot 5b onto both the information area 3a and guide track 2b. The light spot 4 uses the zero-order diffraction light beam from a diffraction grating for performing information recording and focussing. Information pits 6 are formed using the zero-order diffraction beam having the highest light energy among respective order diffraction light beams. Automatic focussing control is conducted by the well known astigmatism method using light reflected from the optical card. The light spots 5a and 5b use the plus/-minus first order diffraction light beams from the diffraction grating. The light spots 5a and 5b having the light energy smaller than the light spot 4 scan parts of the guide tracks 2a and 2b, respectively, to thus conduct tracking control in such a manner that the light spot 4 correctly scans the center of the information recording area 3a.

Figure 2:
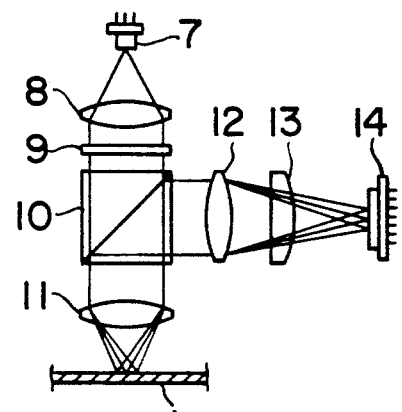
FIG. 2 shows an example of the structure of an optical head for applying a plurality of light spots on an optical card to record and reproduce information.

FIG. 2 shows an example of the structure of an optical head for applying a plurality of light spots onto an optical card 1 to record and reproduce information. In the optical head shown in FIG. 2, a divergent laser beam radiated from a semiconductor laser 7 is made parallel by a collimator lens 8 and thereafter, applied to a diffraction grating 9 to generate a plurality of diffraction light beams including those of the zero order, plus/minus first order, and higher order diffraction light beams. These plural diffraction light beams pass through a beam splitter 10 and are applied to a focussing lens 11 to produce light spots 4, 5a and 5b which are applied onto the optical card 1. The focussing lens 11 is adapted to move in two directions, one being the direction perpendicular to the surface of the optical card 1, and the other being the direction orthogonal to the guide track 2. A plurality of laser beams applied to the optical card 1 are reflected therefrom in accordance with the reflectance of the surface of the optical card 1, reversely applied to the focussing lens 11, reflected by the beam splitter 10 to be directed to the right side, focussed by a light receiving lens 12, imparted with astigmatism by a cylindrical lens 13, and applied to a photodiode 14 which converts optical information contained in the laser beam reflected from the optical card, into electric information.

Figure 3:
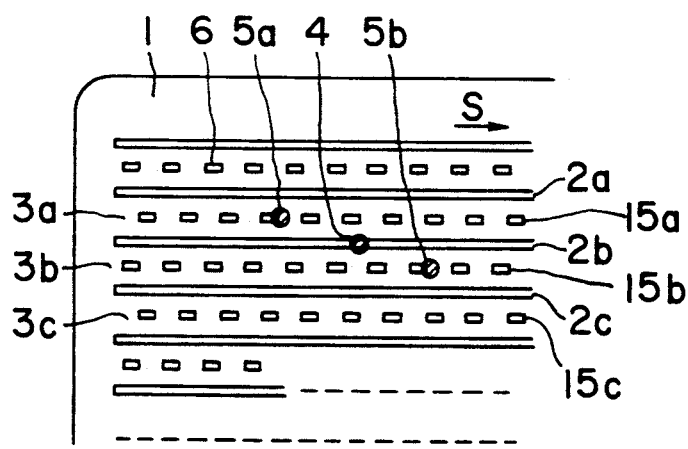
FIG. 3 is a schematic plan view showing an optical card and light spots on the card while information is read at a speed twice as fast as the reproducing speed by using the apparatus of this invention.

FIG. 3 is a schematic plan view showing an optical card and light spots on the card while information is read at a speed twice as fast as the reproducing speed by using the apparatus of this invention. Referring to FIG. 3, an optical card 1 is formed with guide tracks 2 (2a, 2b, 2c, . . . ) and information tracks 15 (15a, 15b, 15c, . . . ) composed of information pits 6. An optical head applies a light spot 4 onto the guide track 2b, a light spot 5a onto the information track 15a, and a light spot 5b onto the information track 15b. The light spot 4 is used for picking up focussing and tracking control signals, the former being by means of the astigmatism method or the like and the latter by means of the push-pull method or the like, respectively of well known in the art. The light spots 5a and 5b are used for picking up information signals. For instance, the optical card 1 is moved from the right to the left in the direction indicated by an arrow S to thus relatively scan the light spots 5a and 5b and reproduce the information signals on the information tracks 15a and 15b, respectively.

Figure 4:
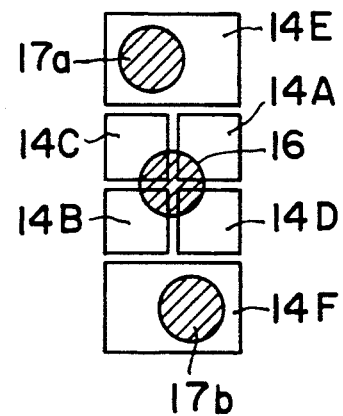
FIG. 4 shows an example of the arrangement of photodiodes, and three light spots received thereon.

FIG. 4 shows an example of the arrangement of photodiodes 14, and three light spots received thereon. Photodiode elements 14A, 14B, 14C and 14D are disposed at the central area in the form of 2×2 matrix, and photodiode elements 14E and 14F are disposed at the upper and lower sides. Three laser beams reflected from the optical card 1 pass through the light receiving lens 12 and cylindrical lens 13 and focussed on the photodiodes 14 as light spots 16, 17a and 17b.

Figure 5:
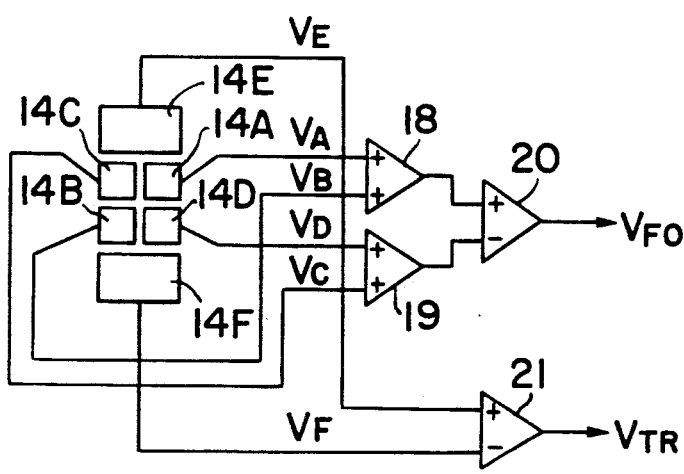
FIG. 5 is a block diagram showing a circuit for picking up a focussing signal and tracking signal from the photodiodes shown in FIG. 4.

The electric outputs from the photodiode elements 14A to 14F are represented by VA to VF as shown in FIG. 5. In recording information in the optical card 1, VFO=(VA+VB)−(VC+VD) and VTR=VE−VF are obtained by adders 18 and 19, and subtracters 20 and 21. The signals VFO and VTR are used as the focussing and tracking control signals, as is well known in the art.

Figure 6:
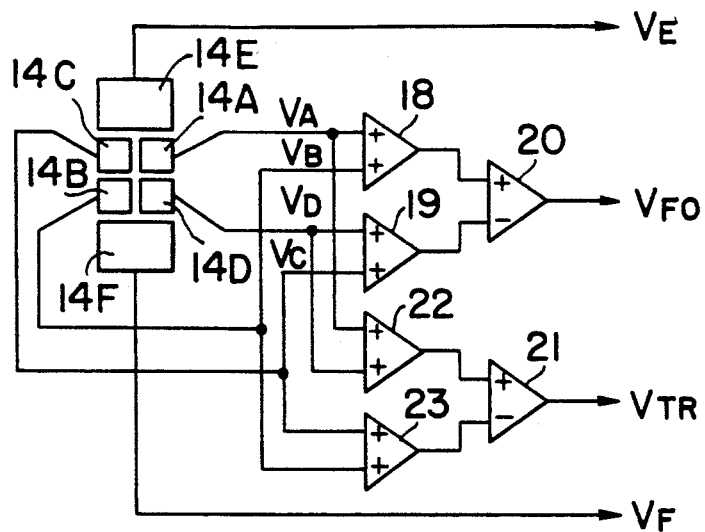
FIG. 6 is a block diagram showing a circuit for picking up a focussing signal, tracking signal, and two reproduced information signals from the photodiodes shown in FIG. 4.

Next, in reproducing information from the optical card 1, VFO=(VA+VB)−(VC+VD) and VTR=(VA+VD)−(VB+VC) are obtained by adders 18, 19, 22, and subtracters 20 and 21, as shown in FIG. 6. The signals VFO and VTR are used as the focussing and tracking control signals, as is well known in the art.

Figure 7:
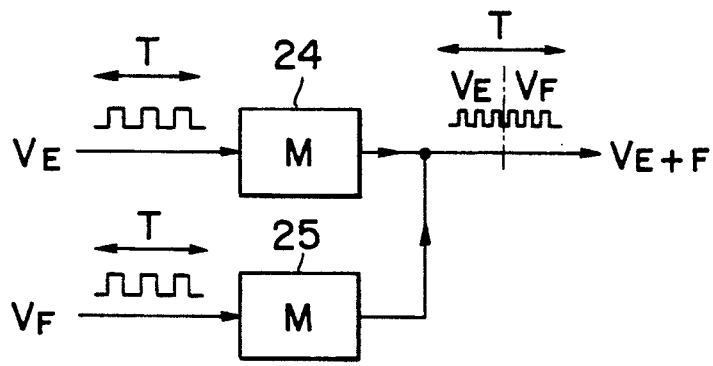
FIG. 7 is a schematic diagram conceptually illustrating the reproduction speed and reading speed twice as fast as the former.

The electric outputs VE and VF from the photodiode elements 14E and 14F are the reproduced signals from the information tracks 15a and 15b which are read at a higher speed than the reproducing speed as in the following. Namely, as shown in FIG. 7, the reproduced signals VE and VF (during a period T) are temporarily stored in memories 24 and 25, respectively. Thereafter, the reproduced and stored information signal VE in the memory 24 is first read at a clock speed twice as fast as the clocks contained in the reproduced information signal VE, and then the reproduced and stored information signal VF in the memory 25 is read at a clock speed twice as fast as the clocks contained in the reproduced information signal VF. Therefore, the information signal V(E+F) is obtained (during the period T). As described above, the information reading speed is twice as fast as the information reproducing speed per one information track.

Figure 8:
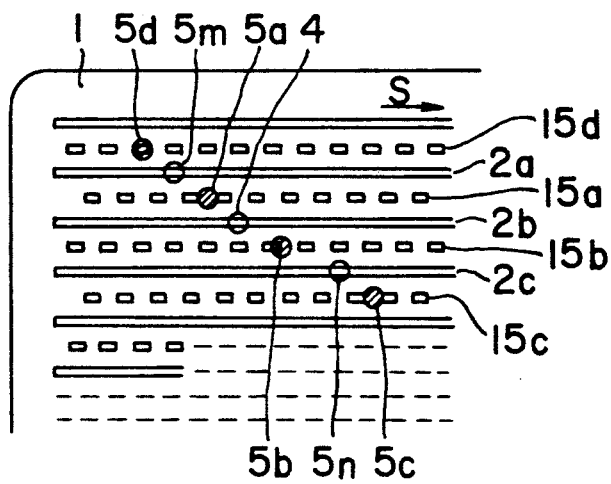
FIG. 8 is a schematic plan view showing an optical card and light spots on the card while information is read at a speed four times as fast as the reproducing speed by using the apparatus of this invention.

FIG. 8 is a schematic plan view showing an optical card and light spots on the card while information is read at a speed four times faster than the reproducing speed by using the apparatus of this invention. In this embodiment, the diffraction grating 9 of the optical head shown in FIG. 2 produces five diffraction light beams including zeroth order, plus/minus first order, and plus/minus third order diffraction light beams. These five light beams are focussed onto the surface of the optical card 1 as light spots 4, 5a, 5b, 5c and 5d by means of the focussing lens 11 which is adapted to be movable in the direction perpendicular to the surface of the optical card 1 and in the direction orthogonal to the guide track 2. In this case, light spots 5m and 5n of the plus/minus second order diffraction light beams are also produced. However, these light spots are not relevant to this invention, and so their description is omitted.

Referring again to FIG. 8, the light spot 4 applied to the guide track 2b of the optical card 1 is reflected therefrom with the focussing information and tracking information being supplied. The light spots 5a, 5b, 5c and 5d applied to the information tracks 15a, 15b, 15c and 15d are reflected therefrom with the information recorded on the tracks being supplied. The five laser beams reflected from the optical card 1 are applied to the photodiodes 14 and converted into electric information signals corresponding to the optical information contained in the laser beams.

Figure 9:
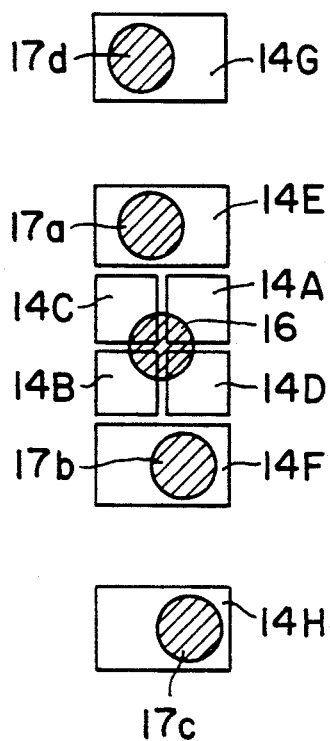
FIG. 9 shows an example of the arrangement of photodiodes, and five spots received on the photodiodes.

FIG. 9 shows an example of the arrangement of photodiodes 14, and five spots received on the photodiodes, to be used in the embodiment shown in FIG. 8. The arrangement of photodiodes 14 has additional photodiode elements 14G and 14H at the upper and lower sides, as compared with the photodiodes 14 shown in FIG. 4. The five laser beams reflected from the optical card 1 are focussed onto the surface of the photodiodes 14 as light spots 16, 17a, 17b, 17c and 17d as shown in FIG. 9.

Figure 10:
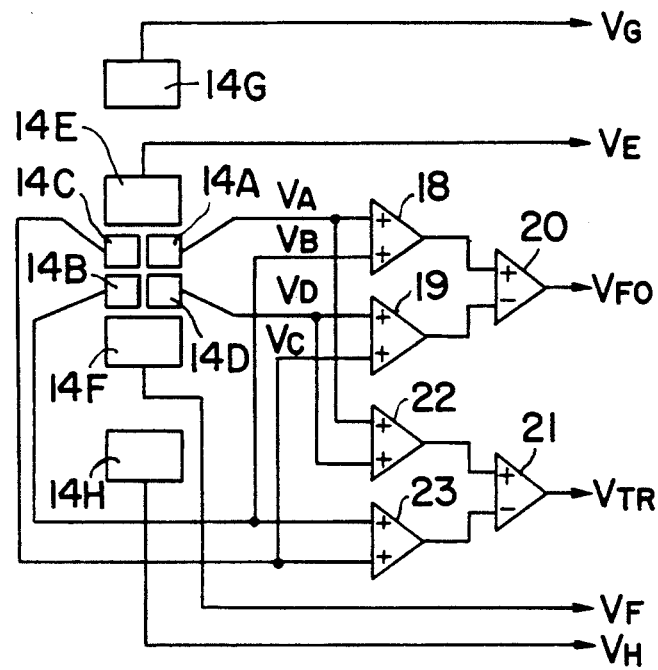
FIG. 10 is a block diagram showing a circuit for picking up a focussing signal, tracking signal, and four reproduced information signals from the photodiodes shown in FIG. 9.
Figure 11:
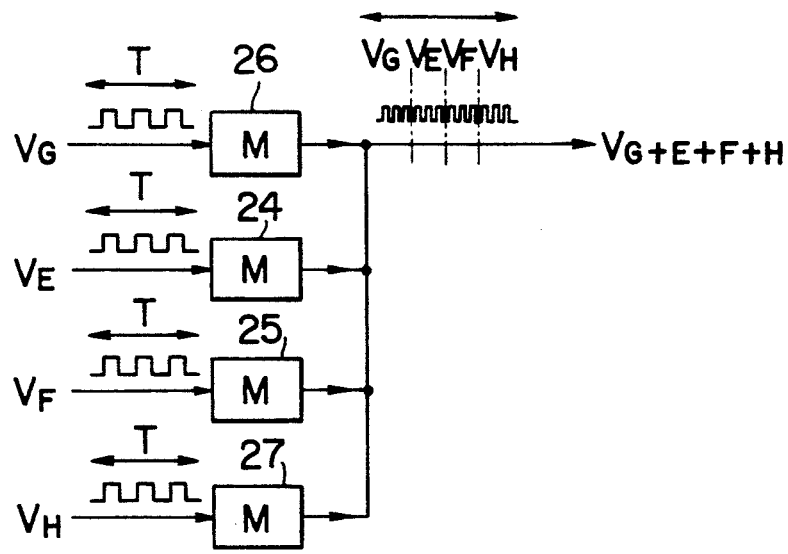
FIG. 11 is a schematic diagram conceptually illustrating the reproduction speed and reading speed four times faster than the former.

The focussing and tracking control signals VFO and VTR shown in FIG. 10 similar to those shown in FIG. 5 are picked up from the photodiodes 14. The reproduced information signals VE, VF, VG and VH are picked up from the photodiode elements 14E, 14F, 14G and 14H, respectively. The electric information signals VE, VF, VG and VH are the reproduced information signals from the information tracks 15a, 15b, 15d and 15c, respectively, which are read at a higher speed than the reproducing speed as in the following. Namely, as shown in FIG. 11, the reproduced signals VE, VF, VG and VH (during a period T) are temporarily stored in memories 24, 25, 26 and 27, respectively. Thereafter, the reproduced and stored information signals VG, VE, VF and VH are read sequentially in this order from the memories 26, 24, 25 and 27 at a clock speed four times as fast as the clocks contained in the reproduced information signals VG, VE, VF and VH, respectively. Therefore, the information signal V(G+E+F+H) is obtained (during the period T). As described above, the information reading speed is four times as fast as the information reproduction speed per information track.

As can be readily understood from the foregoing description, higher- and odd-order diffraction light beams including plus/minus fifth-order, seventh-order diffraction light beams and so on, from the diffraction grating may be used to obtain still higher read speeds.

In the above description of this invention, light spots 5 applied to the optical card 1 are obliquely aligned relative to the guide track 2 and information track 15 as shown in FIGS. 1, 3 and 8. However, light spots 5 may be aligned perpendicular to the guide track 2 and information track 15 on the condition that adjacent light spots are not superposed in part one upon another. Furthermore, higher- and even-order diffraction light beams including plus/minus second-order, fourth-order diffraction light beams from the diffraction grating are not needed, so that it is desirable to design the diffraction grating 9 such that the diffraction light beams of even order have as small an intensity as possible.

According to the apparatus for optically recording and reproducing information of this invention, light spots 5 are applied to the optical card 1 while sequentially and reciprocally scanning the spots 5. Information is stored in a memory at the forward scan, whereas for backward scan, the stored information is read at a speed two times, four or more times faster than the reproducing speed and at the same time, information on the new information tracks is stored in the memory. In recording information in the optical card 1, a single light spot is generally used while reciprocally scanning it. Therefore, use of a plurality of light spots in reproducing information as in the case of the present invention results in reversed time sequence for adjacent information tracks. Whether the reproduced information is at the forward or backward scan can be easily detected on the basis of the address signal recorded on the end portion of each information track. Therefore, the reversed time sequence can be corrected at the time the information is read from the memory.

According to the present invention, the same optical head is used for both information recording and information reproduction following high speed information read. Therefore, it is necessary to switch the electric circuits and optical systems between both cases.

For the electric circuits during the information recording, a large current near the rated value is supplied to the semiconductor laser 7 shown in FIG. 2 to radiate a laser beam of high power, and the three-beam method is employed for tracking. Therefore, the relationship between light spots and tracks on an optical card becomes as shown in FIG. 1, and the tracking control signal VTR is picked up using the circuit arrangement shown in FIG. 5. In reproducing information following high speed information reading, a current supplied to the semiconductor laser 7 shown in FIG. 2 is reduced to radiate a laser beam of low power, and the push-pull method is employed for tracking. Therefore, the relationship among light spots and tracks on an optical card becomes as shown in FIGS. 3 and 8, and the tracking control signal VTR is picked up using the circuit arrangement shown in FIGS. 6 and 10.

Figure 12:
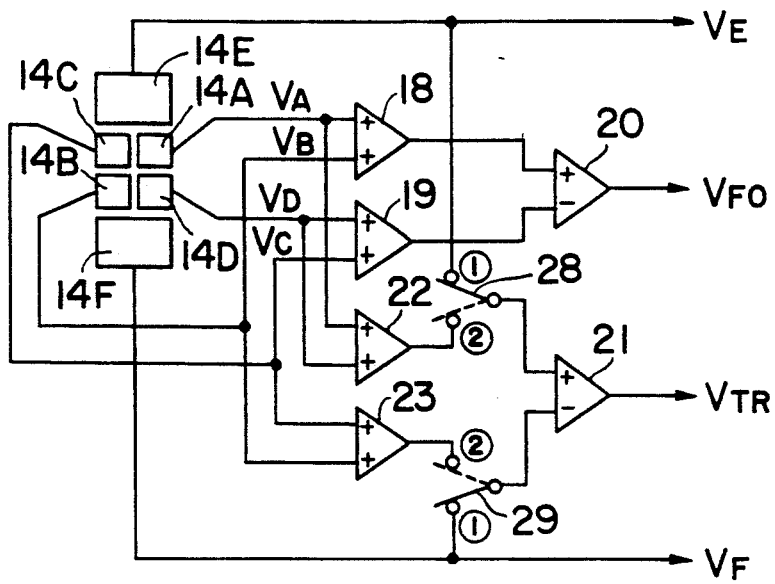
FIG. 12 is a block diagram showing a signal output circuit for switching between the information recording and information reproducing following high speed information reading.

An example of a circuit for switching between the information reading and information reproducing following high speed information reading is shown in FIG. 12.

The circuit shown in FIG. 12 is a combined circuit of those shown in FIGS. 5 and 6. In recording information, switches 28 and 29 are turned to the contacts (1) to select the electric output $VE-VF=VTR$ from the photodiode elements 14E and 14F as the tracking control signal. In reproducing information following high-speed information read, the switches 28 and 29 are turned to the contacts (2) to select the electric output signal $(VA+VD)-(VB+VC)=VTR$ from the photodiode elements 14A, 14B, 14C and 14D as the tracking signal, and the electric output signals VE and VF from the photodiode elements 14E and 14F as the reproduced information signal.

Figure 13A:
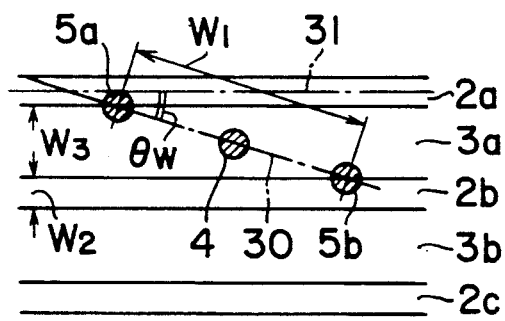
FIGS. 13(a) and 13(b) illustrate a change of angle between a line interconnecting light spots and the guide track, respectively, for information recording and information reproduction following high speed information reading.
Figure 13B:
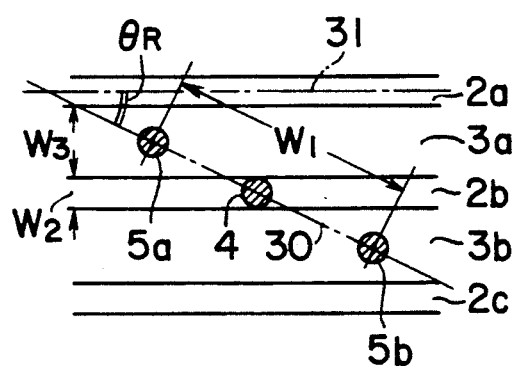
Figure 14A:
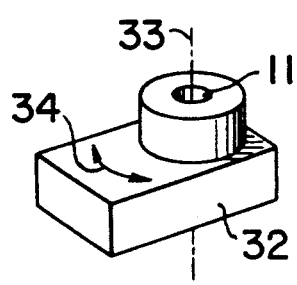
FIGS. 14(a) and 14(b) illustrate a method of changing the angle shown in FIGS. 13(a) and 13(b).
Figure 14B:
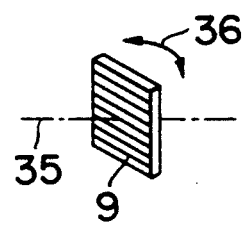

FIGS. 13(a) and 13(b) illustrate a change of angle between a line interconnecting light spots 5a, 4 and 5d and the guide track 2, respectively for the information recording and information reproducing following high speed information reading. An angle between a straight line 30 interconnecting the light spots 5a, 4 and 5b and the center line of the guide track 2a is represented by $\theta W$ and $\theta R$ which are represented by $\theta W = \sin^{-1}(W_3/W_1)$ and $\theta R = \sin^{-1}[(W_2+W_3)/W_1]$, where $\theta W$ is smaller than $\theta R$, $W_1$ is a space between light spots 5a and 5b, $W_2$ is a width of the guide track 2, and $W_3$ is the width of the information track 3. Since $W_1$, $W_2$ and $W_3$ take a constant value if the same optical head and optical card are used, it is necessary to change the mounting angle of the optical head itself or the optical elements thereof such that the angle $\theta W$ is used for the information recording, and $\theta R$ for the information reproducing following high speed information reading. Particularly, an optical head housing 32 may be finely rotated around the optical axis 33 of the focussing lens 11 in the direction indicated by an arrow 34. Alternatively, the diffraction grating 9 may be finely rotated around an optical axis 35 in the direction indicated by an arrow 36. Such fine rotation may be effected by employing various known methods using electromagnetic force.

In the foregoing description of this invention, although a write-once type optical card has been used as an optical information recording medium, the invention is not intended to be limited thereto, as the invention is also applicable to erase/re-recording type optical cards, optical disks and the like.

What is claimed is:

1. An apparatus for optically recording and reproducing information, which uses an optical head having a defraction grating and an optical information recording medium having a guide track comprising:

beam projection means for projecting the optical information recording medium with light spots consisting of at least 0th and plus/minus 1st order diffracted light beams produced by the diffraction grating, said light spots being aligned along a line inclined to the guide track with either a predetermined angle $\theta w$ so as to half-superpose the guide track with the plus/minus 1st order diffracted light beams to detect tracking error when writing or another predetermined angle $\theta R$ so as to project the guide track with the 0th order diffracted light beam to detect tracking error when reading;

photoelectric detecting means having four inner devices positioned orthogonally to each other to receive the 0th order beam, and at least a pair of outer devices positioned at opposite outer sides of the four inner devices to receive at least the plus/minus 1st order beams;

a plurality of memories to store signals detected by said outer devices respectively;

focus error detecting means for providing focus error signal from signals detected by the four inner devices;

tracking error detecting means for providing tracking error signal from either signals detected by the outer devices when writing or signals detected by the inner devices when reading; and information detecting means for producing an information signal based upon signals detected by said outer devices.

2. An apparatus of claim 1, wherein said photoelectric detection means has at least an additional pair of outer devices arranged at opposite outer sides of said outer devices to receive at least plus/minus 3rd order beams.

3. An apparatus of claim 1, wherein the signals stored in said plurality of memories are read out concurrently and parallelly to be combined together so as to make up a signal.

4. An apparatus as claimed in claim 1 wherein the tracking error detecting means further comprising:

switching means for switching between the inner devices to the outer devices to output said tracking error signal when writing, and between the outer devices to the inner devices to output said tracking error signal when reading.

* * * * *